United States Patent [19]

Masucci

[11] 4,263,594
[45] Apr. 21, 1981

[54] ELECTRO-OPTICAL DISPLAY DESIGN

[75] Inventor: Carmine Masucci, Eastchester, N.Y.

[73] Assignee: Izon Corporation, New York, N.Y.

[21] Appl. No.: 72,930

[22] Filed: Sep. 6, 1979

Related U.S. Application Data

[63] Continuation-in-part of Ser. No. 916,740, Jun. 19, 1978.

[51] Int. Cl.³ .............................................. G08B 5/36
[52] U.S. Cl. .................................... 340/795; 340/765;
340/784; 340/366 B; 340/378.2; 340/380;
340/383; 350/345
[58] Field of Search ............... 340/763, 765, 783, 784,
340/795, 366 B, 378.2, 378.4, 380, 383; 350/345

[56] References Cited

U.S. PATENT DOCUMENTS

| | | | |
|---|---|---|---|
| 3,331,277 | 7/1967 | Wehde | 340/378.2 X |
| 3,768,887 | 10/1973 | Portmann | 350/345 |
| 3,899,786 | 8/1975 | Greubel et al. | 340/703 |
| 3,909,823 | 9/1975 | Knowlton | 340/765 |
| 3,966,303 | 6/1976 | Yamamoto | 350/345 |
| 4,118,924 | 10/1978 | Foellner | 340/378.2 X |

*Primary Examiner*—David L. Trafton
*Attorney, Agent, or Firm*—Daniel M. Rosen

[57] ABSTRACT

An electro-optical display device having an assembly of individual, electrically addressable display elements arrayed in a plurality of rows and columns, and a corresponding array of lenses, each of these display elements aligned with and on the optical axis of a respective one of the lenses with its reflective display surface facing the lens, and a screen for receiving the image projected along the plurality of optical axes, the elements displaying the images in accordance with illumination reflected therefrom, wherein the improvement comprises introduction of illumination from the non-reflective side of the display elements into the assembly, and wherein illumination-directing means outside of the optical axes are provided for reflecting the illumination onto the respective reflective display surfaces of each respective display element.

7 Claims, 7 Drawing Figures

4,263,594

ELECTRO-OPTICAL DISPLAY DESIGN

RELATED APPLICATIONS

This application is a continuation-in-part of application Ser. No. 916,740, filed June 19, 1978, and entitled "Electro-Optical Display Device".

BACKGROUND OF THE INVENTION

This invention relates to electronically addressed displays which are capable of displaying alpha-numeric, graphic, and pictorial information translated from an electrical signal supplied to the display. Such displays are widely used in computer terminals, word processors, and other information-handling equipment where it is desired to view electronically stored or transmitted information of an alpha-numeric, graphic, or pictorial nature. More specifically, this invention relates to an electronically addressed electro-optical display which is compact, relatively thin, portable, and yet having a display size, resolution and contrast permitting the display of page sized, typewritten, alpha-numeric, graphic and pictorial information. As was described in the aforementioned parent application Ser. No. 916,740, the disclosure of which is completely and entirely and specifically incorporated by reference herein, an electronic display is provided with an assembly of individual, electrically addressable display elements, arrayed in a plurality of rows and columns, with a corresponding array of lenses, each of the display elements being aligned with and on the optical axis of a respective one of the lenses. The display elements are of either the reflective or transmissive liquid crystal variety, with an illumination source being provided in a manner corresponding to the nature of the display element.

In embodiments wherein it is specifically desired to employ reflective display elements, it has been found that greater structural integrity and ease of assembly is realized by having a source of rear illumination. However, rear illumination is not effective in reflective elements, since the source of illumination is required to be incident upon the reflective element from the same side as the optical axis of the lens. The difficulty with providing illumination from the same side of the display element as the optical axis is evident from an examination of the relative dimensional spacings between the reflective element and its associated lens, as well as other difficulties in introducing pluralities of light sources in and around the projection lens area.

It is therefore the primary object of the present invention to provide a novel and unique arrangement for illumination of reflecting display elements when the illumination of introduced from a source opposite the reflected side of the display element.

A further object of the present invention is to provide a plurality of means, arrayed along a common surface, to implement the direction of the illumination onto the reflective side of the display element over an entire array of such display elements.

SUMMARY OF THE INVENTION

In accordance with the foregoing objects, the present invention provides, in an electro-optical display device having an assembly of individual, electrically addressable display elements arrayed in a plurality of rows and columns, and a corresponding array of lenses, each of these display elements aligned with and on the optical axis of a respective one of the lenses with its reflective display surface facing the lens, and a screen for receiving the image projected along the plurality of optical axes, the elements displaying the images in accordance with illumination reflected therefrom, wherein the improvement comprises introduction of illumination from the non-reflective side of the display elements into the assembly, and wherein illumination-directing means outside of the optical axes are provided for reflecting the illumination onto the respective reflective display surfaces of each respective display element.

More specifically, illumination is introduced by means of a plurality of optical light fibers from the nonreflected side of the display element, through a series of condenser lenses provided along a retaining plate. Contained within the image projection lens is an aperture plate, having a plurality of apertures, each being provided for optical axes. Along the aperture plates are located a plurality of reflecting means, in the form of mirrors or mirrored surfaces, arranged to reflect the light received through the condenser lenses from the fibers onto the reflective side of the display elements. The resulting displayed illumination is passed along the optical axis to the display screen for assembly of images into a single cohesive display as described in the aforementioned parent application. The reflective devices located along the aperture surfaces may include multiple-sided prisms or other forms of mirrors suitable for providing even illumination over the display element.

The foregoing Summary of the Invention will become more apparent from the following more detailed description and appended drawings.

DETAILED DESCRIPTION

Figure 1:
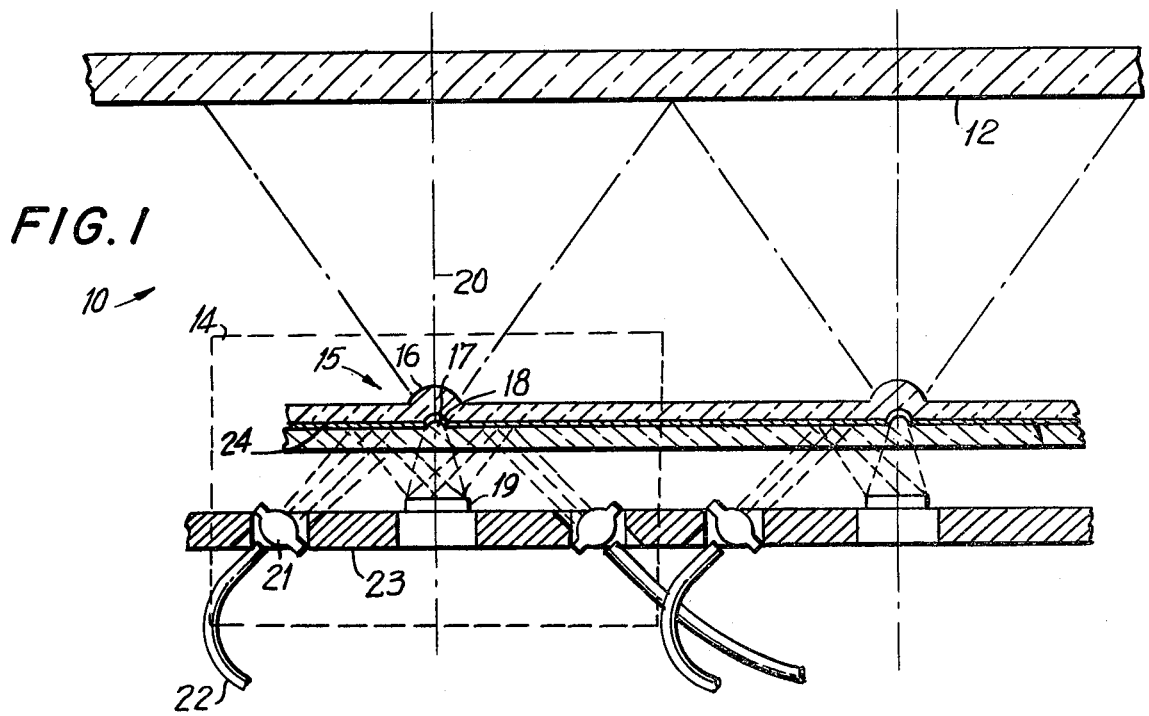
FIG. 1 is a section through a portion of a display device according to one embodiment of this invention.

Referring now to the drawings, particularly FIG. 1, there is shown generally at 10, a display device in accordance with one embodiment of this invention. This display device can include a rear projection screen 12, on which is displayed an alpha-numeric and graphic and pictorial image which is projected from an array of display element modules or sub-sections 14, arranged in a planar array of rows and columns parallel to and facing the plane of the screen 12. Each display element module 14 includes a projection lens system 15 consisting of an upper lens element 16, a lower lens element 17, and an optical stop 18, which stop determines the f-number of the projection lens system. Arranged in a planar array of corresponding rows and columns parallel to the plane of the lens array is an array of liquid crystal display elements 19. Each liquid crystal display element is aligned with a respective one of the projection lenses, and is located on the optical axis 20 of, and in, the optical path of a respective one of the projection lenses. Each liquid crystal display element 19, in this embodiment of the invention, is of the type which forms an image by modulating the reflection of light incident thereon. Accordingly, each display element 19 is illuminated through a condenser lens 21 by an individual light-conducting fiber light pipe 22. The condenser lenses 21 are mounted in a common condenser lens retaining plate 23, which has been provided with appropriate apertures, and with the condenser lenses 21 being mounted at the appropriate angle in accordance with the desired direction of the illumination emerging from the light souce. The light pipes 22 may be assembled into a single cable, composed of multiple light pipes, and light-coupled to an appropriate source of illumination not shown.

The liquid crystal display elements 19 are of the dot-matrix type which form an image in response to an electrical signal by modulating its reflection. Accordingly, illumination provided to the reflecting side of the element 19 and light reflected therefrom is modulated to form an image on the screen 12 when projected from the element 19 through the lenses 15 along the optical axes 20.

In the first embodiment shown in FIG. 1, light is directed along the light pipe 22 through the condenser lens 21, retained in position by the condenser lens retaining plate 23, and angled in such a way as to reflect on a mirrored surface provided as the underlayer of the optical stop 18. Optical stop 18 is a solid sheet, with apertures, which lends itself with ease to the ability of providing a reflective layer 24, formed by silvering or the like, of the underneath portions of the apertured f-stop or optical stop mask 18.

Therefore, light passing through the condenser lens will strike the reflective area and be directed so as to properly illuminate the liquid crystal display element.

Figure 2:
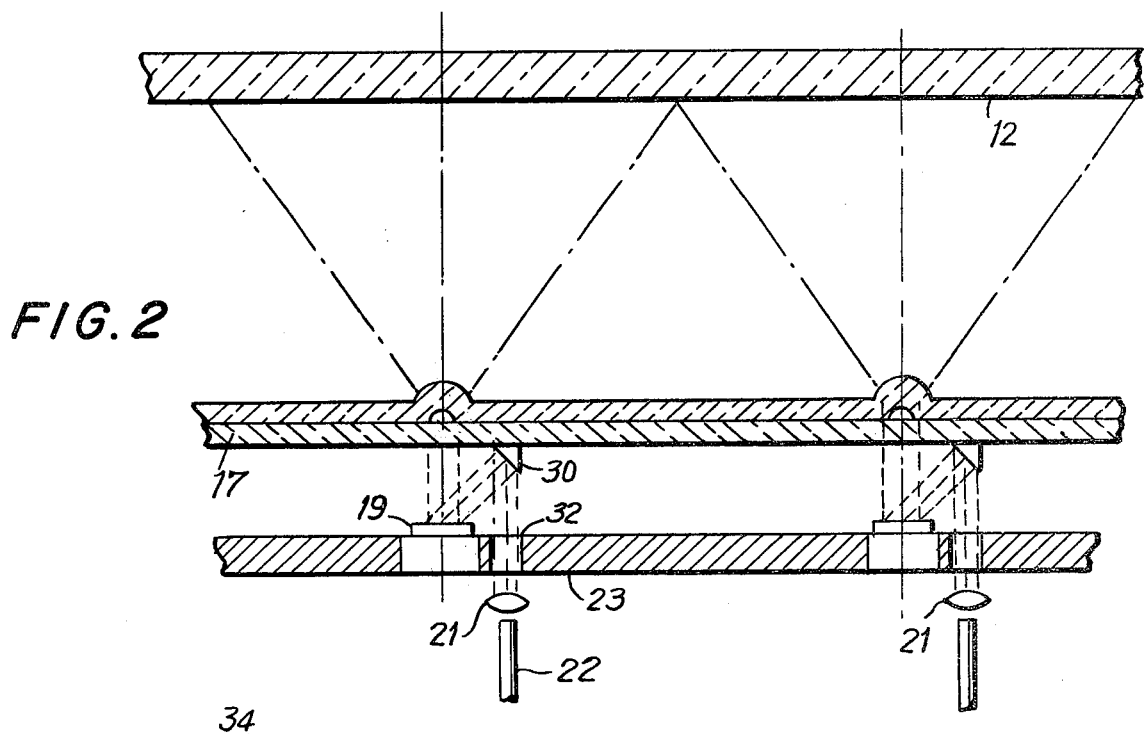
FIG. 2 is a section through a portion of a display device according to another embodiment of this invention.

Referring to FIG. 2, an alternate embodiment of the present invention is illustrated. In this embodiment, a mirrored surface 30 is positioned in the path of the illumination for reflecting illumination of the surface of the display element. The mirrored surface element 30 may be a multi-sided reflecting body, having one or more reflecting side surfaces, and bonded or otherwise secured to the surface of the lower lens element 17. In FIG. 2, the element 30 is shown as an inverted right triangle prism. In this embodiment, the retaining plate 23 may be employed solely with a series of apertures 32 for allowing the passage of light along the light pipe 22 to the condenser lens 21. The condenser lens may also be mounted within the retaining plate 23 in the manner shown in FIG. 1. The assembly of this embodiment is somewhat easier than the assembly of the embodiment of FIG. 1, since accurate positioning of the condenser lens within the retaining plate 23 is not a requirement for accuracy in being positioned. It is only required that the reflecting surface of the reflecting body 30 be positioned so that light emerging from the aperture 32 and the retaining plate 23, strike the reflecting body 30 and be re-directed onto the display element 19.

Figure 3:
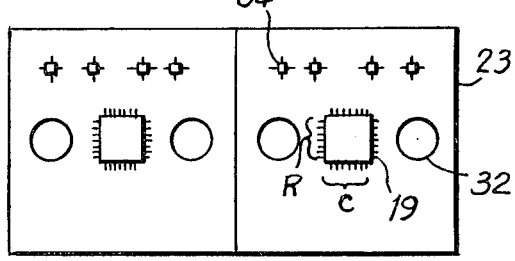
FIG. 3 is an enlarged plan view of several individual display element modules according to one form of this invention.

Referring now to FIG. 3, a top view of the display element modules 14 is shown with the lens area removed. As shown, the display elements 19 are mounted on the retaining plate 23, each display element including a plurality of rows and columns addressing leads R and C, respectively, to serve for individually addressing specific segments on the display elements for the creation of an image in a desired pattern. The driver electronics for the row and columns are indicated by a series of blocks 34, which may be suitable integrated circuitry, conventionally employable for accomplishing the addressing function. Also included on the retaining plate are apertures 32, which may be employed for either the passage of light originating from a source or for retaining condenser lenses, as shown in the previously described figures.

Figure 4:
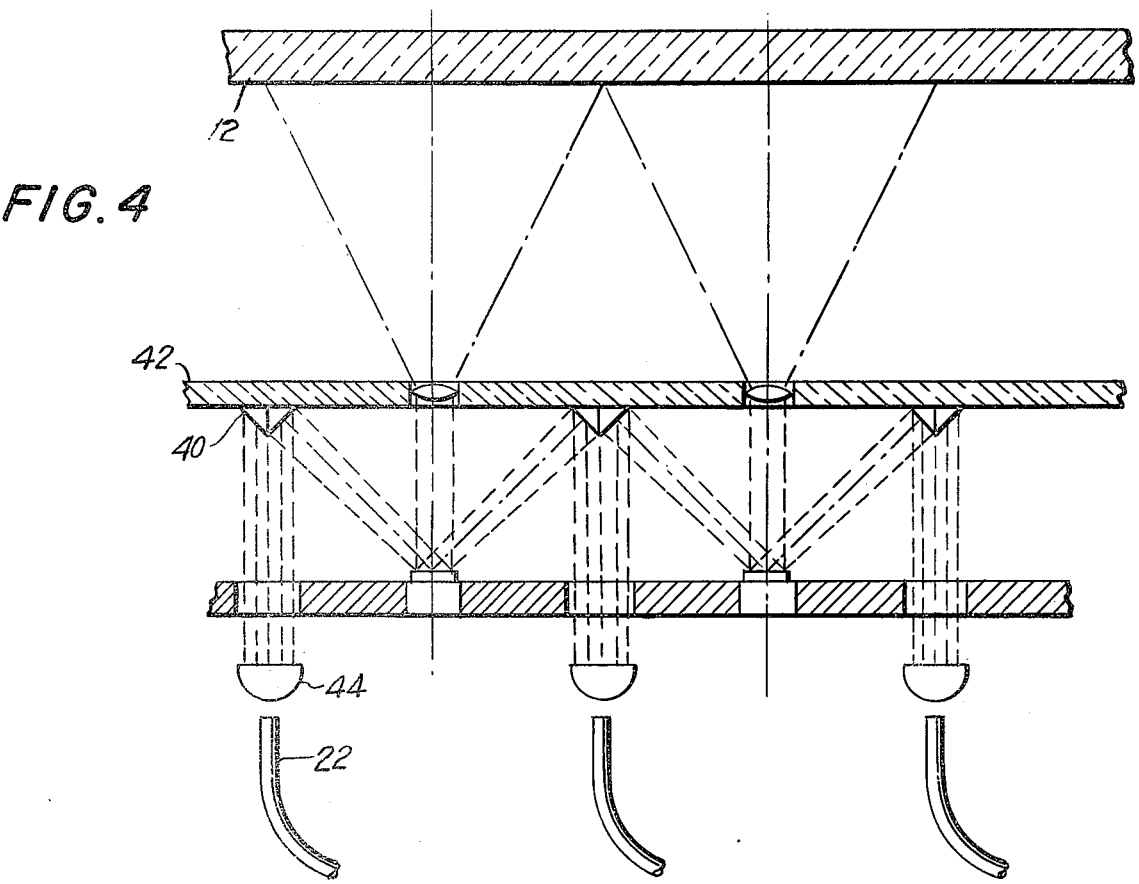
FIG. 4 is a section through a portion of a display device according to another embodiment of the invention.
Figure 5:
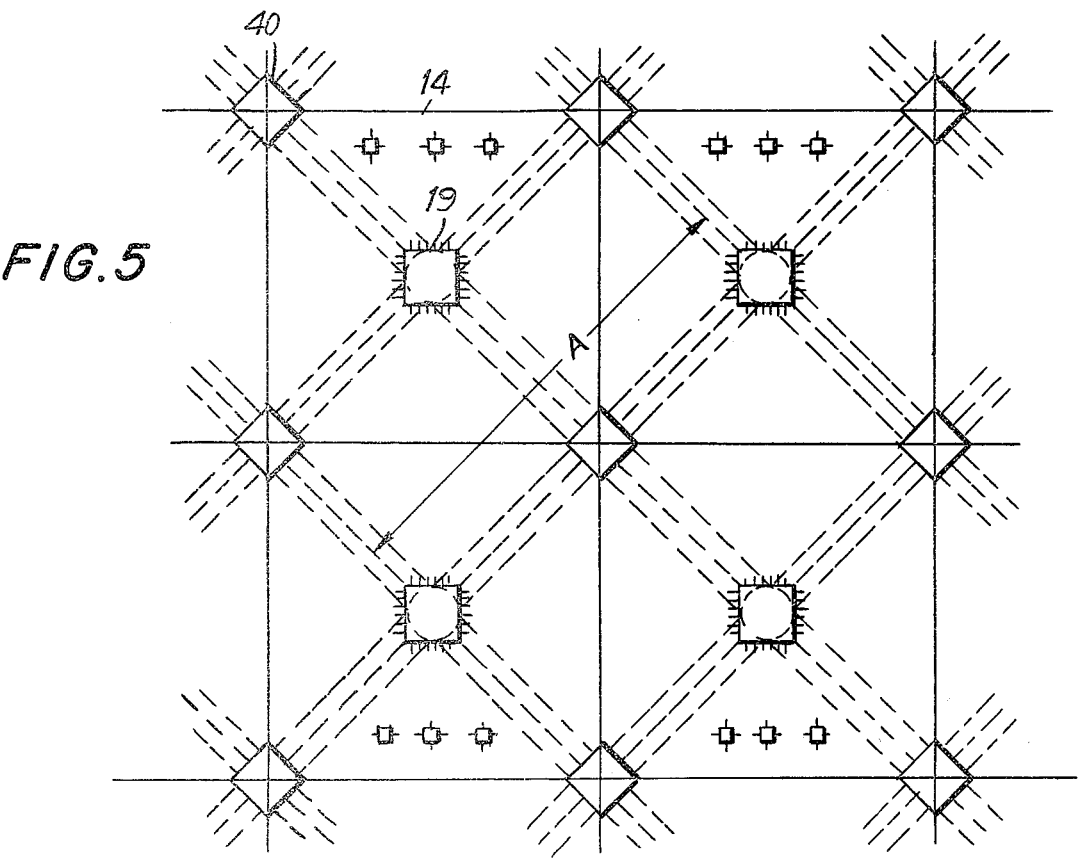
FIG. 5 is a plan view of several individual display element modules according to another form of this invention.

Referring to FIGS. 4 and 5, an alternative embodiment is illustrated for providing even illumination across the display elements 19. As shown in this embodiment, a multiple-sided reflecting body 40 is provided on the image lens area 42, and receives illumination from a plurality of light pipes 21 operating, as heretofore described, through a series of hyperboloid condenser lenses 44. As illustrated in greater detail in FIG. 5, the results of utilizing a four-sided reflecting body 40, in the form of an elevated pyramid, is to provide at least four sources of illumination, from four sides of the display element 19, and directed to each display element for providing a more even illumination distribution. The edges and corners of each of the mirrors may be slightly bevelled or rounded, in order to provide a more fan-shaped illumination, thereby inhibiting or minimizing any illumination changes as a result of module adjustment. By introducing a slightly concave structure to the side walls of the mirrors, a greater concentration of illumination on the elements 19 may be achieved.

Figure 6:
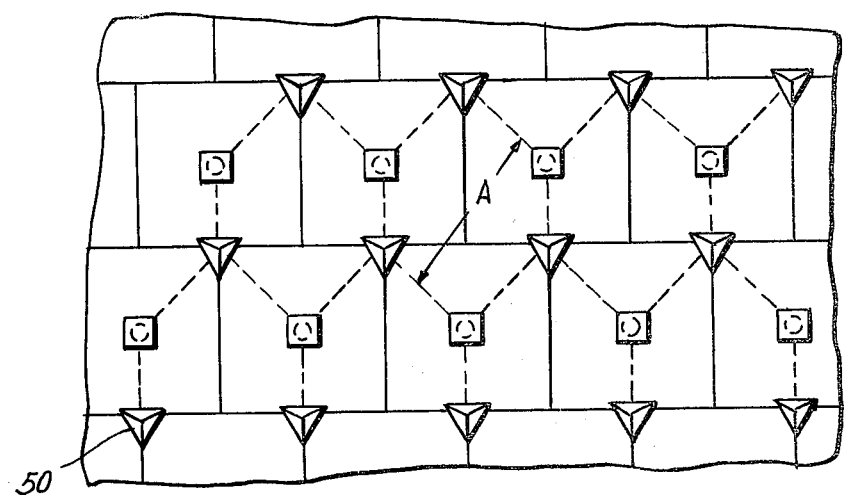
FIG. 6 is a further alternative plan view of several individual display modules according to another form of this invention.
Figure 7:
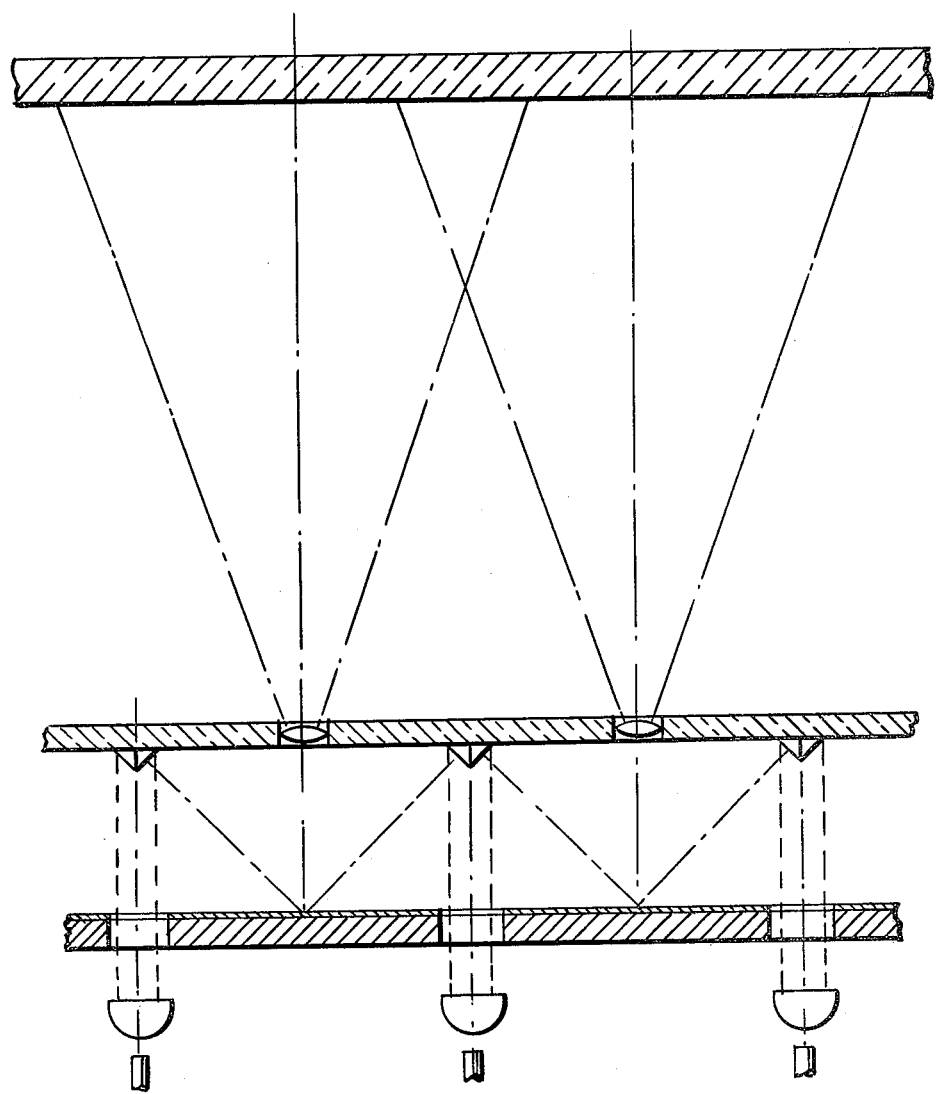
FIG. 7 is a section through a portion of a display device in accordance with another embodiment of the invention.

A further alternative is illustrated in FIGS. 6 and 7. In this alternative, the multiple-sided reflecting body is provided with only three sides, and the element modules are staggered in adjacent rows. In this concept, it is not necessary to arrange the reflecting bodies at the four corners of each module, but rather the module may be illuminated from three sides. As stated in conjunction with the previous embodiments, it may be advantageous to bevel or otherwise shape the edges of the reflecting bodies so as to provide more even illumination should there be slight misalignments in the positioning of the bodies or the modules within the overall matrix, or to shape the walls of the pyramids from base to top with a concave or convex profile to alter the light distribution as desired, as stated above.

It will be obvious to those skilled in the art that other variations in shapes of multiple-sided reflecting bodies may be employed within the concept of the present invention, it being the intent to utilize such optical systems for providing a relatively even illumination distribution over the reflecting elements 19 by means of a light source located in a position opposite to that from which illumination is desired.

It should be noted in each instance that only the dot-matrix, image bearing portion of the display element 19 is in the optical path from the light pipe 21 to the projection lens 15, and that all remaining components, including the illumination re-directing mirrors and mirrored surfaces, are external to the optical path through the lens 15. In addition, it should be noted that the display element modules 14 are arrayed so that the centers of each module, through which the optical axes of lenses 15 pass, are located at the apices of an equilateral triangle, separated from one another by a predetermined distance "A". By selection of this distance "A" and design of lenses 15, the images from elements 19 are projected in overlapping fashion on the screen 12, such that a unitary image is reconstructed from the image segments on elements 19.

Reference is made to U.S. Pat. No. 4,134,650 issued on January 16, 1979, for "Distributed Optical Micro Feature Reader", and assigned to the assignee of the present invention, which describes such a projection technique. The specific and entire disclosure of the aforementioned U.S. Pat. No. 4,134,650 is specifically incorporated herein by reference for the purpose of further explaining the nature and operation of such projection system.

In the form of the invention described herein and by way of example only, the liquid crystal display element includes 100 leads R and 100 leads C, which form a matrix of 10,000 picture elements on each display element 19. The display element 19 is 2/10 of an inch square, while the distances "A" are 1 inch, and an array of 9 ×12 elements 14 is formed. Lenses 15 have a magnification of approximately 5, such that the screen 12 may be filled with a unitary and continuous image, the space being provided contiguous, so that the element 19 for the address circuitry 34 does not disfigure the image. It will also be noted that a relatively thin display of approximately four inches is provided. The light pipes 21, appropriate condenser lenses, and optical re-directing means, such as mirrored surfaces or mirror bodies described above, are all located in a direction generally perpendicular to the optical axis of the lens 15, but out of the optical path, so as to provide a relatively thin display.

It will be understood that larger or smaller display devices desired can be fabricated without departing from the invention, and dimensions different from those described are employed where a larger area or display is desired. Longer focal length projection lenses may also be employed. Alternatively, the number of element modules 14 may be increased or decreased as desired. Further, while the use of a liquid crystal matrix display has been described, other types of displays, such as electro-chromic or electro-phoretic or active element displays may also be employed.

In addition, while a two-element projection lens system of the modified Petzval type has been shown, it will be understood that other single or multiple element projection lens systems may be employed. It will also be understood that different color-contrasting images may be achieved with liquid crystal elements 19, by employing various optical dyes. The illumination re-directing means of the present invention may also be varied. The various mirrored surfaces described in connection with FIG. 1 may be shaped so as to direct the illumination as described. For example, the mirrored surface may be concave or convex, or provided with any series of simple or complex shapes for the purpose of re-directing the illumination. In addition, other forms of multiple-sided bodies may be provided in accordance with the array and range of desired illumination necessary, for illuminating the display elements 19.

While the invention has been disclosed and described with reference to a limited number of embodiments, it will be therefore apparent that variations and modifications may be made therein, and it is therefore intended in the following claims that each such variation and modification falls within the true spirit and scope of the invention.

What is claimed is:

1. In an electro-optical display device having an assembly of individual electrically addressable display elements each having a reflection display surface, said elements arrayed in a plurality of rows and columns, a corresponding array of lenses, each of said display elements aligned with and on the optical axis of a respective one of said lenses with each said reflective display surface facing each said lens, and a screen for receiving images projected along said optical axes, said elements displaying said images in accordance with illumination reflected therefrom, the improvement comprising means for introducing illumination into said assembly from the non-reflective side of such display elements, and illuminating direction means outside each said optical axis for reflecting said illumination onto the reflective display surfaces of each respective display element.

2. The device of claim 1, wherein said illumination directing means comprises a mirrored surface element positioned in the path of said illumination for reflecting such illumination.

3. The device of claim 2, wherein said mirrored surface element is a multi-sided reflecting body.

4. In an electro-optical display having an assembly of individual electrically addressable display elements arrayed in a plurality of rows and columns, a corresponding array of lenses, and a projection screen, each of said display elements aligned with and on the optical axis of a respective one of said lenses, with its reflective display surface facing said lens, said screen receiving images projected along said optical axes, said elements displaying said images in accordance with illumination reflected therefrom, the improvement comprising a source of illumination, a plurality of fiber-optic light pipes, optically coupled to said source of illumination, each of said light pipes being directed to a retaining plate, the retaining plate holding a plurality of said display elements with their display surfaces facing in a direction opposite from the direction of emanation of said illumination, a plurality of apertures located in said retaining plate but outside of said optical axes, means for directing the illumination from said source along said light pipe through said apertures, a plurality of illumination re-directing means, said illumination re-directing means arrayed along the surface opposed to and facing said retaining plate from a direction opposing the direction of illumination entering through said aperture plate, said illumination re-directing means being shaped so as to re-direct said illumination over the reflective surface of each of said display elements in a manner providing an even illumination of said element.

5. The device of claim 4, wherein said illumination re-directing means comprises a mirrored surface element, said mirrored surface element also forming a lens assembly for said image projection.

6. The device of claim 4, wherein said illumination re-directing means comprises a multi-sided body, shaped and formed as an inverted pyramid, having a base supported upon a surface opposing the source of illumination, and a plurality of reflective, triangularly shaped sides, each of said triangular sides formed so as to re-direct said illumination towards the reflective surface of the display element.

7. The device of claim 4, wherein said illumination re-directing means comprises a pyramid having its apex facing towards said source of illumination, and a plurality of reflective sides, each of said sides directing illumination towards a display element, said illumination-directing means being arrayed as plurality of individual pyramidal-shaped elements, each display element receiving illumination from as many pyramidal-shaped objects as there are sides on each pyramidal-shaped bject.

* * * * *